United States Patent Office 3,592,926
Patented July 13, 1971

3,592,926
ANTIFUNGALS BK217β AND BK217γ AND PROCESS FOR PRODUCING SAME
Ping Shu, Pomona, N.Y., and Ferdinand Barbatschi, Kankakee, Ill., assignors to American Cyanamid Company, Stamford, Conn.
Filed Apr. 14, 1969, Ser. No. 815,806
Int. Cl. A61k 21/00
U.S. Cl. 424—120                                         8 Claims

ABSTRACT OF THE DISCLOSURE

This disclosure describes two new antifungals, designated BK217β and BK217γ, produced in a microbiological fermentation under controlled conditions using a new strain of *Streptoverticillium cinnamoneus* and mutants thereof. The new anti-fungals are active against a variety of fungi and thus are useful in inhibiting the growth of such fungi wherever they may be found.

BRIEF SUMMARY OF THE INVENTION

Figure 1:
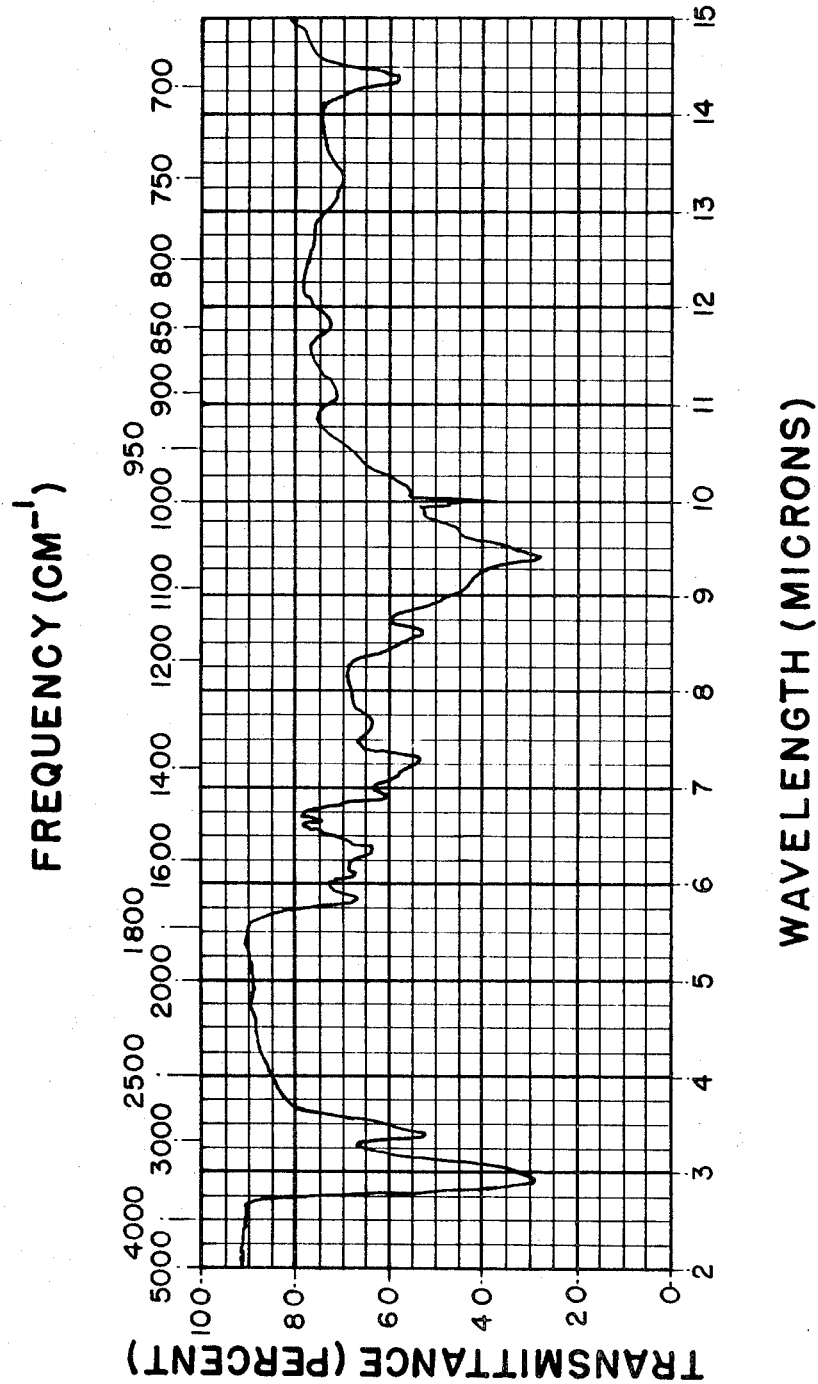

This invention relates to two new antifungals, to their production by fermentation, to methods for their recovery and concentation from crude solutions, and to processes for their purification.

The present invention includes within its scope the antifungals in dilute forms, as crude concentrates, and in pure crystalline forms. These novel products are active against a variety of fungi including *Cryptococcus neoformans* and *Trichophyton tonsurans*. The effects of the new antifungals on specific microorganisms, together with their chemical and physical properties, differentiate them from previously described antifungals.

DETAILED DESCRIPTION OF THE INVENTION

The new antifungals which we have designated BK217β and BK217γ, are formed during the cultivation under controlled conditions of a new strain of *Streptoverticillium cinnamoneus*. This new antifungal producing strain was isolated from a soil sample collected in Montana. A viable culture of the new microorganism has been deposited with the Culture Collection Laboratory, Northern Utilization Research and Development Division, United States Department of Agriculture, Peoria, Ill., and has been added to its permanent collection. It is freely available to the public in this depository under its accession number NRRL 3594.

The description and identification of this new microorganism, mainained in the culture collection of the Lederle Laboratories Division, American Cyanamid Company of Pearl River, N.Y., was supplied by Dr. H. D. Tresner of these laboratories. The following is a general description of the organism *Streptoverticillium cinnamoneus*, NRRL 3594, based on diagnostic characteristics observed. The underscored descriptive colors and color chip designations are taken from Jacobson et al., "Color Harmony Manual", 3rd Ed. (1948), Container Corporation of America, Chicago, Illinois.

Amount of growth

Moderate to good on most media; very good on tomato paste oatmeal and potato dextrose agars; light and restricted on Czapek's solution agar.

Aerial mycelium and/or en masse spore color

Aerial mycelium whitish; spore masses in pinkish shades, ranging from Bisque (4 ec) to Dusty Peach (5 ec) to Flesh Pink (5 ca) to Pearl Pink (3 ca) to Nude Tan (4 gc). Sporulation light to heavy depending upon medium.

Soluble pigments

Yellowish to yellowish-brown when present; absent on several media.

Reverse color

In yellowish to yellowish-brown shades on most media.

Miscellaneous physiological reactions

Nitrates not reduced; complete liquefaction of gelatin in 7 days; melanoid pigment not produced on peptone- TABLE I
[Cultural characteristics of *Streptoverticillium cinnamoneus* NRRL 3594]
Incubation: 14 days
Temperature: 28° C.

| Medium | Amount of growth | Aerial mycelium and/or spores | Soluble pigment | Reverse color | Remarks |
|---|---|---|---|---|---|
| Czapeks' solution agar | Light, restricted | Aerial mycelium whitish, thin. Trace of pinkish sporulation. | None | Pinkish white | |
| Asparagine dextrose agar | Moderate | do | do | Bamboo (2 fb) | |
| Hickey and Tresner's agar | Good | Aerial mycelium whitish, becoming Bisque (4 ec) to Dusty Peach (5 ec) in sporulation zones. Sporulation heavy. | Yellowish; light. | Lt. Amber (3 ic) to Cinnamon (3 le). | |
| Yeast extract agar | Moderate; restricted | Aerial mycelium whitish becoming Bisque (4 ec) is sporulation zones. Sporulation light. | None | Bamboo (2 fb) to Dk. Luggage Tan (4 pg). | |
| Kuster's Oatflake agar | Good | Aerial mycelium whitish, becoming Flesh Pink (5 ca) to Bisque (4 ec) in sporulation zones. Sporulation good. | Yellowish-brown; light. | Bamboo (2 fb) to Dk. Luggage Tan (4 pg). | |
| Tomato paste oatmeal agar | Very good | Aerial mycelim whitish, becoming Nude Tan. (4 gc) in sporulaing zones. Sporulation good. | Yellowish-brown; moderate. | Dk. Luggage Tan (4 pg) to Chestnut Brown (4 ni). | Abundant amber-colored exudate. |
| Potato dextrose agar | Very good | Aerial mycelium whitish, becoming Bisque (4 ec) to Dusty Peach (5 ec) in sporulation zones. Sporulation heavy. | Yellowish-brown; moderate. | Dk. Luggage Tan (4 pg) to Chestnut Brown (4 ni). | |
| Bennett's agar | Moderate | Aerial mycelium whitish, becoming Bisque (4 ec) in sporulating zones. Sporulation moderate. | Yellowish-brown; light. | Lt. Amber (3 ic) to Dk. Cinnamon (3 le). | |
| Inorganic salts-starch agar | do | Aerial mycelium whitish, becoming Pearl Pink (3 ca) in sporulation zones. Sporulation moderate. | None | Lt. Tan (3 gc) | |

TABLE II

[Micromorphology of *Streptoverticillium cinnamoneus* NRRL 3594]

| Medium | Aerial mycelium and/or sporiferous structures | Spore shape | Spore size | Spore surface |
|---|---|---|---|---|
| Inorganic salt-starch agar | Spore chains arising as biverticillate branches from long trailing hypae. | Spores elliptical to elongate. | 0.6–0.7µ x 1.0–1.3µ | Spore surfaces smooth as determined by electron microscopy at 8000X. |

TABLE III

[Miscellaneous physiological reaction of *Streptoverticillium cinnamoneus* NRRL 3594]
Temperature: 28° C.

| Medium | Incubation period | Amount of growth | Physiological reaction |
|---|---|---|---|
| Organic nitrate broth | 7 days | Moderate | Nitrates not reduced. |
| Do | 14 days | do | Do. |
| Gelatin | 7 days | do | Complete liquefaction. |
| Do | 14 days | do | Do. |
| Peptone-iron agar | 24 hours | do | Melanoid pigments not produced. |
| 4–13% NaCl in yeast extract agar | 10 days | | Tolerates a maxium of 7% NaCl in its growth medium. | iron agar. Carbon source utilization, according to the Pridham and Gottlieb [J. Bacteriol. 56, 107–114 (1948)] method, as follows: fair to good utilization of dextrose, d-trehalose, i-inositol and galactose; poor or non-utilization of d-xylose, lactose, d-fructose, adonitol, 1-arabinose, d-mannitol, 4-melezitose, d-melibiose, d-raffinose, 1-rhamnose, salicin, and sucrose. Tolerates a maximum of 7% NaCl in its growth medium.

Micromorphology

Spore chains arise as biverticillate branches from long trailing hyphae. Spores elliptical to elongate 0.6–0.7µ x 1.0–1.3µ. Spore surface smooth as determined by electron microscopy at 8000X.

The biverticillate nature of the sporophores of NRRL 3594 places it taxonomically in the genus Streptoverticillium. Furthermore, the pinkish spores of the organism relates it to a small group of biverticillate species. When a side by side comparison was made with reference cultures of these organisms, NRRL 3594 was found to correspond most closely in all other essential features to the strains of *S. cinnamoneus*. Therefore, NRRL 3594 will, hereafter, be considered a strain of that species.

Observations were made of the cultural, physiological and morphological features of the culture in accordance with the methods detailed by Shirling and Gottlieb [Internat. Journ. of Syst. Bacteriol. 16: 313–340 (1966)]. Media used in the study were selected from those recommended by Pridham et al. [Antibiotics Annual 1956–1957, p. 947–953] for the cultivation of actinomycetes. Detailed observations are recorded in the previous Tables I, II, III, and IV below. Underscored descriptive colors are taken from the "Color Harmony Manual."

Table IV.—Carbon source utilization pattern of *Streptoverticillium cinnamoneus* NRRL 3594

Incubation: 14 days
Temperature: 28° C.

| Carbon source: | Utilization [1] |
|---|---|
| Adonitol | 0 |
| 1-arabinose | 0 |
| Galactose | 2 |
| d-Fructose | 1 |
| i-Inositol | 3 |
| Lactose | 1 |
| d-Mannitol | 0 |
| d-Melezitose | 0 |
| d-Melibiose | 0 |
| d-Raffinose | 0 |
| 1-rhamnose | 0 |
| Salicin | 0 |
| Sucrose | 0 |
| d-Trehalose | 3 |
| d-Xylose | 1 |
| Dextrose | 3 |
| Negative control | 0 |

[1] 3—good utilization; 2—fair utilization; 1—poor utilization; 0—no utilization.

It is to be understood that for the production of the new antifungals the present invention is not limited to this particular organism nor to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure, and the like.

The fermentation process

Cultivation of the organism *S. cinnamoneus* NRRL 3594 may be carried out in a wide variety of liquid culture media. Media which are useful for the production of the novel antibiotic include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcuim, sulfate, phosphate, chloride, etc. Trace elements such as boron, molybdenum, copper, etc.; are supplied as impurities of other constituents of the media. Aeration in tanks and bottles by forcing sterile air through or onto the surface of the fermenting medium. Further agitation in tanks is provided by a mechanical impeller. An antifoaming agent such as lard oil may be added as needed.

Inoculum preparation

Shaker flask inoculum of *Streptoverticillium cinnamoneus* NRRL 3594 is prepared by innoculating 100 milliliters of sterile liquid medium in 500 milliliter flasks with scrapings or washings of spores from an agar slant of the culture. The following medium is ordinarily used.

| | Grams |
|---|---|
| Cerelose | 20 |
| Soy flour X200 | 10 |
| Corn steep liquor | 5 |
| Calcium carbonate | 3 |

Water to 1,000 milliliters.

The flasks are incubated at a temperature of 24°–30° C., preferably 28° C. and agitated vigorously on a rotary shaker for 30 to 48 hours. The 100 milliliter inocula are used to inoculate 12 liter batches of the same medium in 20 liter glass fermentors. The inoculum mash is aerated with sterile air while growth is continued for 30 to 48 hours. These batches of inocula are used to inoculate tank fermentors.

Tank fermentation

For the production of the antifungals in tank fermentors the following fermentation medium is preferably used.

|  | Grams |
|---|---|
| Cerelose | 10 |
| Soy flour X200 | 10 |
| Prograsol [1] | 5 |
| Sodium chloride | 5 |
| Calcium carbonate | 1 |
| Water to 1,000 milliliters. | |

[1] Prograsol is the trade name for distillers' solubles from corn. Publicker Industries, Philadelphia, Pa.

Each tank containing the above sterilized medium is inoculated with 3 to 9% of the inoculum as described above. Aeration is supplied at 0.5 to 1.0 liter of sterile air per liter of mash per minute and the fermenting mixture is agitated by an impeller driven at 200–800 r.p.m. The temperature is maintained at 24–30° C., usually at 28° C. The fermentation is ordinarily continued for 48 to 200 hours at which time the mash is harvested.

Isolation procedure

After the fermentation is completed, the fermented mash containing the antifungals of this invention is filtered, preferably with the addition of diatomaceous earth or any other conventional filter aid. Normally the mycelial cake and filter pad is washed with a small portion of water. Both filtrate and wash are discarded. The mycelial cake is slurry-washed in chloroform and the antifungals are extracted with methanol using about 1 liter of methanol for every 5 to 7 liters of liquid mash. The methanolic extract is concentrated to an aqueous phase, and a crude solid product containing components BK217α, BK217β and BK217γ is formed. The solid product is collected and slurry-washed with acetone and dried over phosphorous pentoxide or other drying agent ordinarily under reduced pressure and at room temperature.

A portion of the above solid is extracted with isopropanol and the extract is evaporated to dryness. The residue is purified by column chromatography on alumina using methanol as eluant using standard techniques and followed by repeated recrystallizations to yield purified BK217α.

To obtain BK217β and BK217γ another portion of the above solid is extracted with methanol and the methanolic extract is added to approximately two volumes of diethyl ether resulting in the precipitation of crude BK217β. The solid is recovered and dried and then purified first by column chromatography on a Sephadex LH20 column using 80% methanol in water. The thus-purified BK217β is further purified by use of solvent counter-current distribution following ordinary techniques and using standard two-phase solvent systems. The residue from the above methanolic extract is dried, yielding semi-pure BK217γ. This component also may be further purified by counter-current distribution following ordinary techniques and using standard two-phase solvent systems.

Physical characteristics

The novel antifungal agents of this invention, BK217β and BK217γ, may be distinguished by selected physical characteristics. The analytical samples of both components contain the elements carbon, hydrogen, nitrogen and oxygen in substantially the following average percentages by weight:

|  | BK217β | BK217γ |
|---|---|---|
| Carbon | 58.95 | 60.22 |
| Hydrogen | 8.17 | 8.24 |
| Nitrogen | 1.17 | 1.62 |
| Oxygen (by difference) | 31.81 | 29.36 |
| Ash | None | 0.56 |

Component BK217β has no distinct melting point. A standard infrared absorption spectrum of BK217β prepared in a KBr pellet is shown in FIG. 1 of the accompanying drawings. This componet exhibits characteristic absorption in the infrared regions of the spectrum at the following wavelengths expressed in microns: 2.97, 3.43, 5.79, 6.12, 6.35, 6.69, 6.92, 7.28, 7.70, 8.63, 9.43, 11.1, 11.85, 14.39.

The β component in methanol shows ultraviolet absorption maxima at:

$$303\ m\mu\ (E^{1\%}_{1\ cm.}=228)\ \text{shoulder}$$

$$318\ m\mu\ (E^{1\%}_{1\ cm.}=460)$$

$$333\ m\mu\ (E^{1\%}_{1\ cm.}=733)$$

$$350\ m\mu\ (E^{1\%}_{1\ cm.}=745)$$

The specific rotation of BK217β is $[\alpha]_D^{25°}=-10.3°$ ($\pm0.4°$) (c.=0.5 in dimethylformamide).

BK217β contains mycosamine, a known and described amino sugar, as part of its molecular structure.

BK217β gives the following results to selected color-tests.

Color responses of BK217β

| Test: | Response |
|---|---|
| Molish | +. |
| Ninhydrin | —. |
| 2,4-dinitrophenylhydrazine | +. |
| Concentrated sulfuric acid | Strong violet, brown on standing. |

Component BK217γ has no distinct melting point. A standard infrared absorption spectrum of BK217γ prepared in a KBr pellet is shown in FIG. 8 of the accompanying drawings. This component exhibits characteristic absorption in the infrared region of the spectrum at the following wavelengths expressed in microns: 2.97, 3.43, 5.87, 6.15, 6.40, 6.92 (shoulder), 7.23, 8.59, 9.41, 9.91, 11.87, 13.26, 14.42.

The γ component in methanol shows ultraviolet absorption maxima at:

$$345\ m\mu\ (E^{1\%}_{1\ cm.}=326)\ \text{shoulder}$$

$$361\ m\mu\ (E^{1\%}_{1\ cm.}=672)$$

$$379\ m\mu\ (E^{1\%}_{1\ cm.}=1136)$$

$$405\ m\mu\ (E^{1\%}_{1\ cm.}=1286)$$

The specific rotation of BK217γ is $[\alpha]_D^{25°}=+231°$ ($\pm0.5°$) (c.=0.5 in dimethylformamide.)

BK217γ contains mycosamine as part of its molecular structure.

BK217γ gives the following results to selected color-tests.

Color Responses of BK217γ

| Test: | Response |
|---|---|
| Molish | +. |
| Ninhydrin | —. |
| 2,4-dinitrophenylhydrazine | +. |
| Concentrated sulfuric acid | Blue, violet on standing. |

The novel compounds of the present invention are useful as antifungal agents and possess broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile asparagine-meat extract agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates in inspected visually and the extent, if any, of fungal growth is noted. The minimal inhibitory concentration (expressed in micrograms per milliliter) is defined as the concentration of test compound causing complete inhibition of growth of any particular organism.

In a representative operation, the minimal inhibitory concentration of the compounds of this invention against standard laboratory microorganisms, as determined in the above-described assay, are set forth in Table V below:

TABLE V

| Organism | Minimal inhibitory conc. (mcg./ml.) | |
|---|---|---|
| | BK217β | BK217γ |
| Candida albicans E83 | 1 | 0.5 |
| Cryptococcus neoformans E138 | 0.5 | 0.5 |
| Microsporum canis ATCC 10214 | 5 | 5 |
| Microsporum gypseum ATCC 14683 | 100 | 25 |
| Philalophora jeanselmei E16 | 50 | >100 |
| Trichophyton mentagrophytes E11 | 25 | 5 |
| Trichophyton rubrum E97 | 25 | 10 |
| Trichophyton tonsurans E10 | 10 | 5 |

The high in vitro antifungal activity of the novel compounds of the present invention makes them useful alone, or in combination with other antifungal agents, to prevent the growth of, or reduce the number of, such organisms as *Cryptococcus neoformans* and *Trichophyton tonsurans* present in various environments. They are thus useful in soaps, shampoos and topical compositions for the treatment of wounds and burns. Also, they are useful in wash solutions for sanitation purposes, as in the washing of hands and the cleaning of equipment or furnishings of contaminated rooms or laboratories.

The usefulness of the new antifungals is also demonstrated by their ability to control systemic lethal infections of *Cryptococcus neoformans* in mice. The test with *C. neoformans* was run with Carworth Farms CF1 female mice, weight about 20 grams, infected intravenously with a lethal dose of a 24 hours trypticase soy broth culture of the organism. The infected mice were treated with BK217β or BK217γ in varying dosages by subcutaneous injections within one hour after infection. Tables VI and VII, below, summarize the results obtained with BK217β and BK217γ against *C. neoformans* as compared with nystatin, a well-known antifungal. It will be noted that both BK217β and KB217γ are significantly more active than nystatin.

TABLE VI

| Subcutaneous dosage (mg./ kg. of body weight) | Alive/total mice 3 days after infection | |
|---|---|---|
| | BK217β | Nystatin |
| 200 | | 5/5 |
| 50 | | 2/5 |
| 12 | 5/5 | 1/5 |
| 3 | 5/5 | |
| 0.8 | 2/5 | |
| 0.2 | 0/5 | |

NOTE.—Infected, non-treated control mice: 1/20.

TABLE VII

| Subcutaneous dosage (mg./ kg. of body weight) | Alive/total mice 7 days after infection | |
|---|---|---|
| | BK217γ | Nystatin |
| 400 | | 10/10 |
| 100 | | 6/10 |
| 50 | 10/10 | 1/10 |
| 12 | 10/10 | 1/10 |
| 3 | 10/10 | |
| 0.8 | 2/10 | |
| 0.2 | 2/10 | |

NOTE.—Infected, non-treated control mice: 0/20.

Antifungal BK217β is also active in vivo against *Candida albicans*. The test with *C. albicans* was run with Carworth Farms CF1 female mice, weight about 20 grams, infected intravenously with a lethal dose of a 1:20 dilution of a 24 hour trypticase soy broth culture of the organism. The infected mice were treated with BK217β in varying dosages by subcutaneous injections within one hour after infection. Table VIII, below, summarizes the results obtained with BK217β against *C. albicans* as compared with nystatin. Again it will be noted that BK217β is significantly more active than nystatin.

TABLE VIII

| Subcutaneous dosage (mg./ kg. of body weight) | Alive/total mice 6 days after infection | |
|---|---|---|
| | BK217β | Nystatin |
| 200 | | 4/5 |
| 50 | | 4/5 |
| 12 | 4/5 | 0/5 |
| 3 | 5/5 | |
| 0.8 | 1/5 | |
| 0.2 | 0/5 | |

NOTE.—Infected, nontreated control mice: 0/20.

The invention will be described in greater detail in conjunction with the following specific examples.

EXAMPLE 1

Inoculum preparation

A typical medium used to grow the primary inoculum was prepared according to the following formula:

| | Grams |
|---|---|
| Cerelose | 20 |
| Soy flour X200 | 10 |
| Corn steep liquor | 5 |
| Calcium carbonate | 3 |
| Water to 1,000 milliliters. | |

The washed or scraped spores from an agar slant of *S. cinnamoneus* NRRL 3594 were used to inoculate two, 500 milliliter flasks containing 100 milliliters each of the above sterile medium. The flasks were placed on a rotary shaker and agitated vigorously for 48 hours at 28° C. The resulting flask inoculum was transferred to a 20 liter glass fermentor containing 12 liters of sterile medium. The glass fermentor was aerated with sterile air while growth was carried out for about 48 hours, after which time the contents was used to seed a 300 liter tank fermentor.

EXAMPLE 2

Tank fermentation

A fermentation medium is prepared according to the following formula:

| | Grams |
|---|---|
| Cerelose | 10 |
| Soy flour X200 | 10 |
| Prograsol | 5 |
| Sodium chloride | 5 |
| Calcium carbonate | 1 |
| Water to 1,000 milliliters. | |

Three hundred liters of the above fermentation medium in a 400 liter stainless steel tank fermentor was sterilized at 120° C. with steam at 15 pounds pressure for 55–60 minutes. The medium was cooled to 28° C. (water cooling jacket), and 12 liters of inoculum, prepared as described in Example 1, was introduced asceptically into the tank. The fermentation was carried out at 28° C., aeration being supplied at the rate of 0.5 liter of sterile air per liter of mash per minute. The mash was agitated by an impeller rotating at a speed of 200 r.p.m. From time to time when needed, Hodag LG–8 oil was added as defoaming agent. At the end of approximately 66 hours of fermentation time the mash was harvested.

EXAMPLE 3

Isolation of crude BK217α and preparation of crystalline BK217α

Three hundred liters of fermented mash was filtered with about 2% (w./v.) of diatomaceous earth filter aid and the filter pad washed with about 30 liters of water. The filtrate and wash were both discarded. The mycelial cake was slurry-washed with about 50 liters of chloroform, the suspension filtered and the chloroform discarded. The washed cake was extracted by suspending in about 50 liters of methanol with stirring for about one-half hour. This suspension was filtered and the cake was washed with an additional 20 liters of methanol. The extracts and wash were pooled and the spent mycelial cake was discarded. The combined methanolic extracts were concentrated to an aqueous suspension (volume 4 liters), the solids of which contained a mixture of the three component antifungals; BK217α, BK217β and BK217γ.

The suspension was centrifuged and the solids were slurried in acetone. The supernatant was decanted and the heavy residue (crude BK217α) was dried over phosphorous pentoxide under reduced pressure at room temperature, weight 25.3 grams. A portion (20 grams) of the crude BK217α was slurry extracted six times, each with 200 milliliters of isopropanol. The extract was evaporated to dryness and dissolved in about 150 milliliters of ethanol. The insoluble residue was removed by filtration and discarded. 75 milliliters of the ethanolic extract was charged onto an alumina column (60 grams) and the column washed with 240 milliliters of ethanol and then eluted with 500 milliliters of methanol. The progress of the elution was followed by monitoring the optical density of the effluent at 235 and 300 m$\mu$. Fractions containing BK217α were collected and concentrated to almost dryness. The solid residue was dissolved in ethanol and the solution was filtered. The clear filtrate was concentrated to about 4 milliliters. Purified BK217α was precipitated when diethyl ether was added to the ethanolic concentrate. The solid precipitate was collected by centrifugation and washed with diethyl ether. The washed precipitate was dissolved in 5 milliliters of water-saturated butanol and diethyl ether was added until a crystalline solid began to form. The resultant suspension was allowed to stand overnight at 4° C. At the end of the period, the crystalline BK217α was separated by filtration, washed with diethyl ether and dried over P$_2$O$_5$ under reduced pressure at room temperature, weight 270 milligrams.

EXAMPLE 4

Isolation of crude BK217β and crude BK217γ

Three hundred liters of fermented mash was filtered with about 2% (w./v.) of diatomaceous filter aid and the filter pad washed with about 30 liters of water. The filtrate and wash were both discarded. The mycelial cake was slurry-washed with about 50 liters of chloroform, the suspension filtered and the chloroform discarded. The washed cake was extracted by suspending in about 50 liters of methanol and stirring for about one-half hour. This suspension was filtered and the cake re-extracted with an additional 20 liters of methanol. The extracts were pooled and the spent mycelial cake was discarded. The combined methanolic extract (volume 78 liters) was concentrated to an aqueous suspension (volume 15 liters) the solids of which contained a mixture of BK217α, BK217β and BK217γ. The suspension was centrifuged and the solids were slurried two times in acetone using 2.0 liters of acetone each time. The remaining wet residue was extracted with two 2.0 liter portions of methanol and the combined methanol extract was added to 8.0 liters of diethyl ether. The precipitate which formed, crude BK217β, was separated by centrifugation and dried over phosphorous pentoxide under reduced pressure at room temperature, weight 21.9 grams. The crude BK217β was purified as described in Example 5.

The residue from the above methanolic extraction, crude BK217γ, was dried over phosphorous pentoxide under reduced pressure at room temperature, weight 29.1 grams. The thus-obtained crude BK217γ was purified as described in Example 6.

EXAMPLE 5

Preparation of BK217β

10 grams of crude BK217β, obtained as described in Example 4, was suspended in about 60 milliliters of dimethylsulfoxide and the suspension extracted with 485 milliliters of 80% methanol in water. The insoluble matter was separated by centrifugation. The clear solution was charged onto a Sephadex LH20 column (1kilogram) [the Sephadex LH20 was prepared for use by slurrying with 80% methanol in water] and the column was eluted with 80% methanol in water. The progress of the elution was followed by monitoring the optical density of the effluent at 350 and 405 m$\mu$. Fractions containing BK217β were pooled and concentrated under reduced pressure to an aqueous phase. The precipitate was collected by centrifugation and washed twice with water. About 0.7 gram of BK217β was obtained. Fractions containing BK217γ, obtained after the elution of BK217β, may be either discarded or saved for later recovery as described in Example 6 (alternative procedure).

A portion (0.56 gram) of BK217β was further purified by the use of solvent counter-current distribution. The solvent system comprised 2 parts methanol, 2 parts chloroform and 1 part 0.1 M sodium acetate buffer at pH 4.6. The counter-current distribution was carried out in a 200-tube apparatus using 10 milliliters upper phase and 10 milliliters lower phase per tube. The BK217β to be purified was dissolved in 30 milliliters of lower phase and charged into the first three tubes. Two hundred transfers were made. At the completion of the transfers, samples were taken from each tube and the optical density at 350 and 405 m$\mu$ was determined. Appropriate tubes containing BK217β were pooled and evaporated to an aqueous phase. The precipitate was separated by centrifugation and washed twice with water. The microcrystalline material thus obtained was dried over P$_2$O$_5$ under reduced pressure at room temperature. The yield of pure BK217β was 89 milligrams.

EXAMPLE 6

Preparation of BK217γ

A portion (100 milligrams) of crude BK217γ, obtained as described in Example 4, was purified using counter-current distribution technique and following essentially the procedure of Example 5. The sample was dissolved in 70 milliliters of lower phase and 35 milliliters of upper phase and charged into the first 7 tubes. The yield of BK217γ was about 20 milligrams.

(Alternative procedure): The BK217γ-containing fractions from the Sephadex LH20 column were pooled and evaporated under reduced pressure until a fine crystalline solid began to precipitate. The solid was collected by centrifugation and washed three times with portions of methanol and then with water. After drying over P$_2$O$_5$ under reduced pressure at room temperature, 0.11 gram of purified BK217γ was obtained.

What is claimed is:
1. Antifungal BK217β, a compound which
   (a) is effective in inhibiting the growth of fungi; and in its essentially pure crystalline form
   (b) has an optical rotation $[\alpha]_D^{25°} = -10.3°$ ($\pm 0.4°$) (c.=0.5 in dimethylformamide):
   (c) has the following elemental analysis (percent): C, 58.95; H, 8.17; 0, 31.81; N, 1.17;
   (d) has ultraviolet absorption maxima at:

03 mμ ($E_{1cm.}^{1\%}$=228) shoulder, 318 mμ ($E_{1cm.}^{1\%}$=460), 33 mμ ($E_{1cm.}^{1\%}$=733), 350 mμ ($E_{1cm.}^{1\%}$=745); and (e) has a characteristic infrared absorption spectrum as shown in FIG. 1 of the accompanying drawings.

2. A compound as defined in claim 1, antifungal BK217β, in its essentially pure form.

Figure 2:
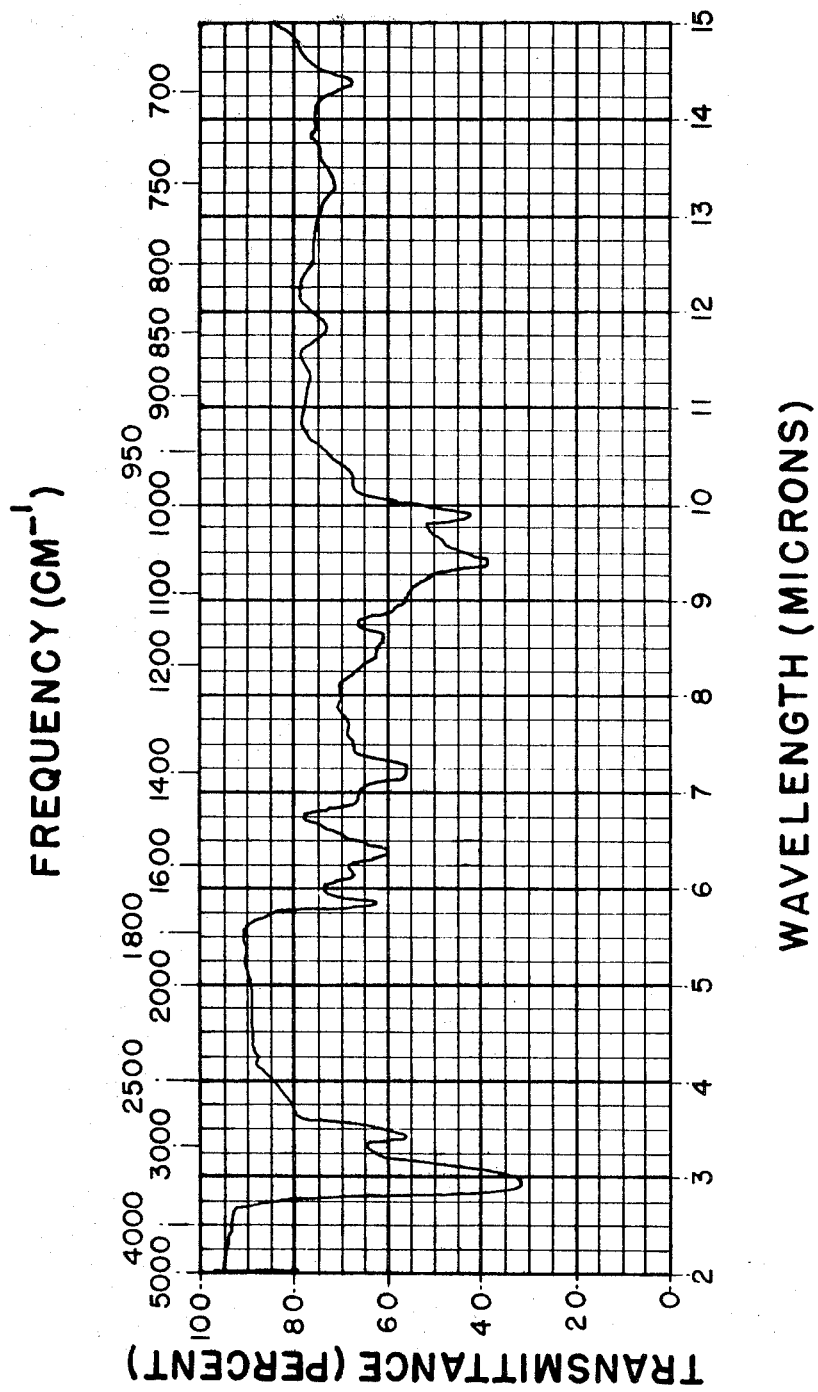

3. Antifungal BK217γ, a compound which
 (a) is effective in inhibiting the growth of fungi; and in its essentially pure crystalline form
 (b) has an optical rotation $[\alpha]_D^{25°}$=+231° (±0.5°) (c.=0.5 in dimethylformamide):
 (c) has the following elemental analysis (percent): C, 60.22; H, 8.24; O, 29.36; N, 1.62;
 (d) has ultraviolet absorption maxima at:

($E_{1cm.}^{1\%}$=326) shoulder, 361 mμ ($E_{1cm.}^{1\%}$=672,) $E_{1cm.}^{1\%}$=1136), 405 mμ ($E_{1cm.}^{1\%}$=1286); and (e) has a characteristic infrared absorption spectrum as shown in FIG. 2 of the accompanying drawings.

4. A compound as defined in claim 3, antifungal BK217γ, in its essentially pure form.

5. A process for the production of antifungal BK217β which comprises cultivating *Streptoverticillium cinnamoneus* NRRL 3594 in an aqueous nutrient medium containing assimilable sources of carbohydrate, nitrogen and inorganic salts under submerged aerobic conditions until substantial antifungal activity is imparted to said medium by the production of antifungal BK217β, as defined in claim 1, and then recovering antifungal BK217β therefrom.

6. A process for the production of antifungal BK217β which comprises cultivating *Streptoverticillium cinnamoneus* NRRL 3594 in an aqueous nutrient medium containing assimilable sources of carbohydrate, nitrogen and inorganic salts under submerged aerobic conditions for a period of from 48 to 200 hours and at a temperature of from 24° C. to 30° C. until substantial antifungal activity is imparted to said medium by the production of antifungal BK217β, as defined in claim 1, and then recovering antifungal BK217β therefrom.

7. A process for the production of antifungal BK217γ which comprises cultivating *Streptoverticillium cinnamoneus* NRRL 3594 in an aqueous nutrient medium containing assimilable sources of carbohydrate, nitrogen and inorganic salts under submerged aerobic conditions until substantial antifungal activity is imparted to said medium by the production of antifungal BK217γ, as defined in claim 3, and then recovering antifungal BK217γ therefrom.

8. A process for the production of antifungal BK217γ which comprises cultivating *Streptoverticillium cinnamoneus* NRRL 3594 in an aqueous nutrient medium containing assimilable sources of carbohydrate, nitrogen and inorganic salts under submerged aerobic conditions for a period of from 48 to 200 hours and at a temperature of from 24° C. to 30° C. until substantial antifungal activity is imparted to said medium by the production of antifungal BK217γ, as defined in claim 3, and then recovering antifungal B2217γ therefrom.

References Cited

Miller, The Pfizer Handbook of Microbial Metabolites, McGraw-Hill Book Co., Inc., New York, 1961, p. 392. (Nos. 820 and 821).

JEROME D. GOLDBERG, Primary Examiner

U.S. Cl. X.R.

195—80; 424—121

UNITED STATES PATENT OFFICE
CERTIFICATE OF CORRECTION

Patent No. 3,592,926          Dated July 13, 1971

Inventor(s) Ping Shu, Ferdinand Barbatschi

It is certified that error appears in the above-identified patent and that said Letters Patent are hereby corrected as shown below:

Column 2, line 10, "mainained" should read -- maintained --. Column 3, line 49, "are recorded in the previous tables" should read -- are recorded in tables --. Column 6, line 29, "Figure 8" should read -- Figure 2 --. Column 11, line 1, "03 m$\mu$" should read -- 303 m$\mu$ --; line 2, "33 m$\mu$" should read -- 333 m$\mu$ --; line 15, "maxima at" should read -- maxima at: 345 m$\mu$ --; line 16, "=672,)" should read -- =672,)379 m$\mu$ --. Column 12, line 25 "B2217√" should read -- BK217√ --.

Signed and sealed this 15th day of February 1972.

(SEAL)
Attest:

EDWARD M. FLETCHER, JR.          ROBERT GOTTSCHALK
Attesting Officer                Commissioner of Patents